United States Patent
Mudulodu

(10) Patent No.: US 9,001,753 B1
(45) Date of Patent: Apr. 7, 2015

(54) ASSIGNMENT AND USE OF WIRELESS LAN CHANNELS IN HIGH STATION DENSITY ENVIRONMENTS

(75) Inventor: Sriram Mudulodu, Sunnyvale, CA (US)

(73) Assignee: Redpine Signals, Inc., San Jose, CA (US)

( * ) Notice: Subject to any disclaimer, the term of this patent is extended or adjusted under 35 U.S.C. 154(b) by 181 days.

(21) Appl. No.: 13/278,456

(22) Filed: Oct. 21, 2011

Related U.S. Application Data

(60) Provisional application No. 61/405,207, filed on Oct. 21, 2010.

(51) Int. Cl.
*H04W 4/00* (2009.01)
*H04W 40/26* (2009.01)

(52) U.S. Cl.
CPC ..................... *H04W 40/26* (2013.01)

(58) Field of Classification Search
USPC .......................................................... 370/329
See application file for complete search history.

(56) References Cited

U.S. PATENT DOCUMENTS

| | | | |
|---|---|---|---|
| 2008/0163024 A1* | 7/2008 | Lakkis | 714/752 |
| 2008/0176577 A1* | 7/2008 | Bourlas et al. | 455/454 |
| 2009/0310692 A1* | 12/2009 | Kafle et al. | 375/260 |
| 2009/0323646 A1* | 12/2009 | Ketchum et al. | 370/338 |
| 2011/0188484 A1* | 8/2011 | Reznik et al. | 370/338 |

* cited by examiner

*Primary Examiner* — Dang Ton
*Assistant Examiner* — Nourali Mansoury
(74) *Attorney, Agent, or Firm* — File-EE-Patents.com; Jay A. Chesavage

(57) ABSTRACT

An access point operates in a frequency spectrum which is divided into master channels, each master channel further having a plurality of sub-channels, each sub-channel capable of supporting a wireless LAN session independently of any other said sub-channel. The access point assigns one of the sub-channels within the master channel to a requesting station according to a maximum number of user assigned to the particular sub-channel, or alternatively, the access point makes the assignment of a particular sub-channel to a particular station according the bandwidth requirement bandwidth requirement.

16 Claims, 4 Drawing Sheets

Dense Access Point Distribution with Dynamic Channel Assignment

Distributed Access Points in Stadium
Prior Art

WLAN IEEE Channels & subcarriers

Figure 3
STA selects strongest AP of {AP1, AP2, AP8, AP11}
STA Associates with AP1
Figure 4
Dense Access Point Distribution with Dynamic Channel Assignment
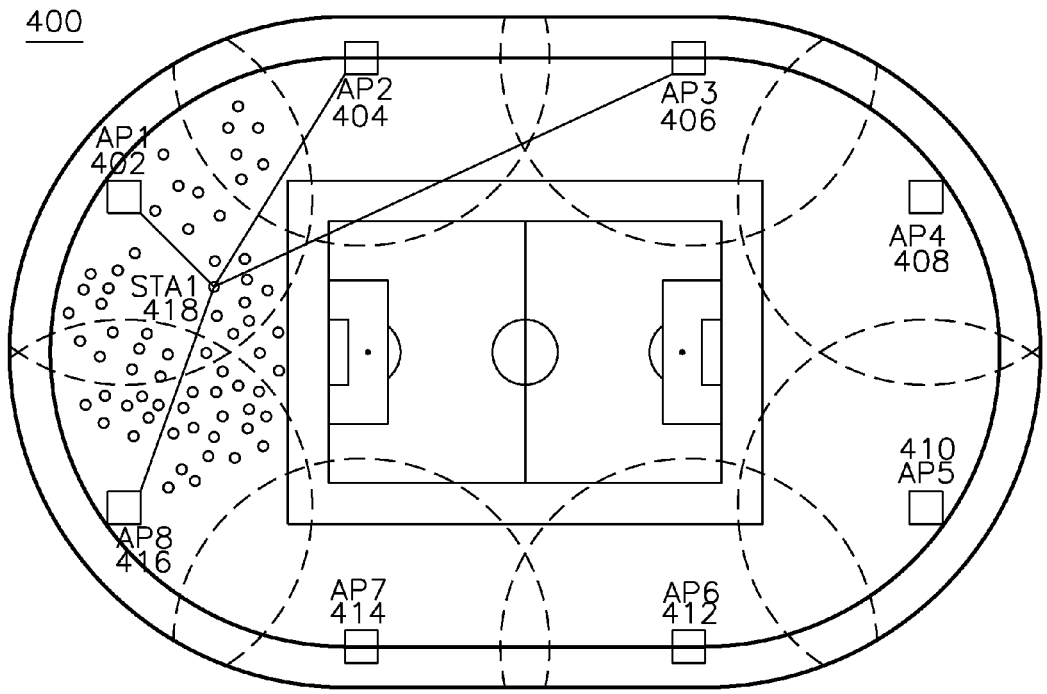
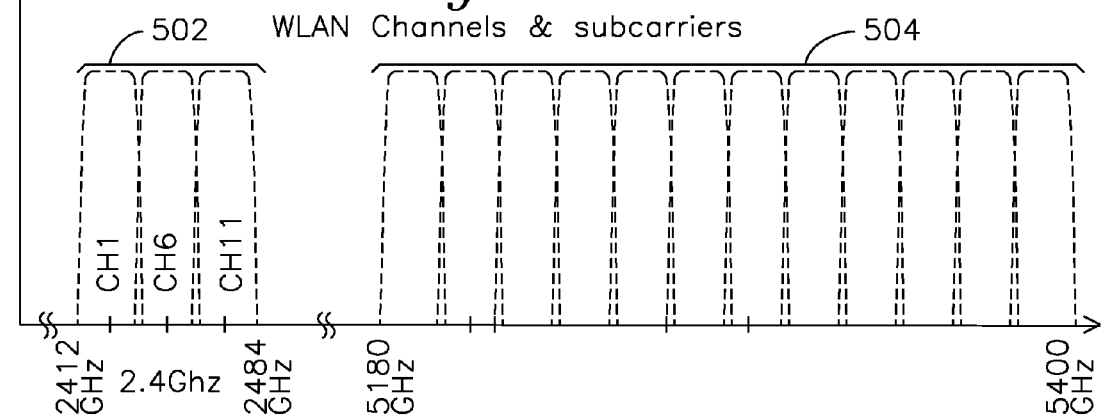
Figure 5
WLAN Channels & subcarriers

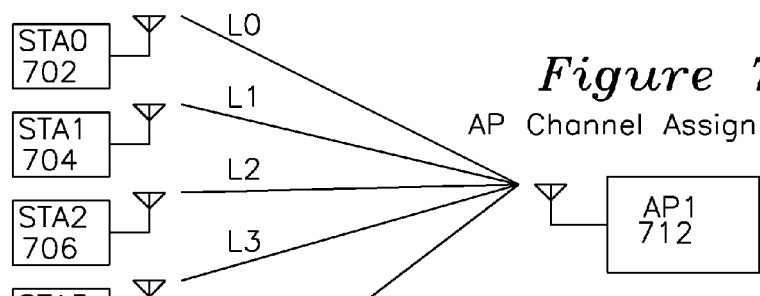

2D array configuration

US 9,001,753 B1

ASSIGNMENT AND USE OF WIRELESS LAN CHANNELS IN HIGH STATION DENSITY ENVIRONMENTS

The present application claims priority of provisional patent application 61/405,207 filed Oct. 21, 2010.

FIELD OF THE INVENTION

The present invention relates to the utilization of a wireless local area network (WLAN) channel. In particular, it relates to the utilization and assignment of WLAN channels to wireless stations in dense user environments such as stadiums and other high wireless user-density situations.

BACKGROUND OF THE INVENTION

FIG. 1 shows the diagram of a prior art distributed access point deployment, such as a sports stadium. Many wireless users may congregate in the stadium, and enhance their sport viewing experience using portable wireless devices which include a WLAN capability. In the prior art, a plurality of access points AP1 102, AP2 104, AP3 106, AP4 108, AP5 110, AP6 112, AP7 114, AP8 116 are placed around the perimeter of the stadium, or in any manner which provides adequate WLAN coverage over the stadium. FIG. 2 shows the prior art utilization of a segment of the wireless spectrum, and a common division is channel 1 208 which contains 64 or 128 subcarriers of OFDM modulation data, and channel 6 210 and channel 11 212 are similarly configured. WLAN communications systems which operate according to IEEE standard 802.11b or 802.11g operate with each station (STA) associated with a particular access point (AP), such that a plurality of stations may use an access point which is operative in CH1, a different plurality of stations may use an access point which is operative in CH6, and yet another plurality of stations may use an access point operative in CH 11. Under the IEEE 802.11a and 802.11g WLAN standards, the simultaneous transmission by an access point and station is known as a collision, and the associated AP and STA will re-transmit the packet when the recipient of the corrupted packet fails to acknowledge receipt by detecting the missing sequence number of the corrupted packet in the received packet stream. When two access points attempt to equally share a channel such as CH1, a likelihood exists that both access points will transmit at the same instant in time, which will result in superposition of the subcarriers from each and the receiving STA will simply see a corrupted OFDM symbol. For this reason, the access points operate in separate channels, such as an example shown in FIG. 1, where configuration of the access points AP1 through AP8 is done to maximize the distance between two access points using the same channel, such as AP1 102 and AP5 110. In the prior art, a station such as STA1 can select a strongest AP such as AP1 102 without concern for residual interference from distant AP5 110 which is operative on the same channel.

A problem occurs where a large plurality of users 120 are located in a single access point region, and this problem is exacerbated when all of these users have a large amount of data to transmit or receive. In this case, the particular channel CH1 is shared by a large number of users who overwhelm the capacity of the channel, and quality of service to all users in that particular quadrant is degraded. It is desired to provide an improved quality of service for a cluster of high density WLAN users.

OBJECTS OF THE INVENTION

A first object of this invention is the assignment of available channels from a set of possible channels, the available channels used for reducing congestion to an access point by assignment of the available channels according to the number of stations using a particular channel, or according to the bandwidth requirements of the stations.

A second object of the invention is the advertisement by an access point of one of several available channels used by the access point, the available channels assigned to the access point according to number of stations using a particular channel, or according to the bandwidth requirements of the station.

SUMMARY OF THE INVENTION

In a high density user environment, an access point (AP) simultaneously transmits on several sub-channels, or an increased number of access points are provided which are configured in such a manner as to allow a particular STA to select one of a plurality of available sub-channels with equivalent signal strength for association. When an access point detects an unusually high utilization of traffic on a particular channel, the STA is requested to change to a different channel with lower utilization, either by number of client users, or by volume of traffic.

BRIEF DESCRIPTION OF THE DRAWINGS

FIG. 3 shows the flowchart for MAC layer association.

FIG. 4 shows a diagram of the topology of a dense access point distribution with dynamic channel assignment in the present invention.

FIG. 5 shows WLAN channels and subcarriers.

FIGS. 6A, 6B, 6C show tables maintained by each access point of the present invention FIG. 7 shows an access point with shared-media wireless links to a plurality of wireless stations served by an access point.

FIG. 8A shows a table of stations and channel assignments maintained by an access point.

FIG. 8B shows a table of stations and channel assignments maintained by a different access point.

DETAILED DESCRIPTION OF THE INVENTION

Figure 1:
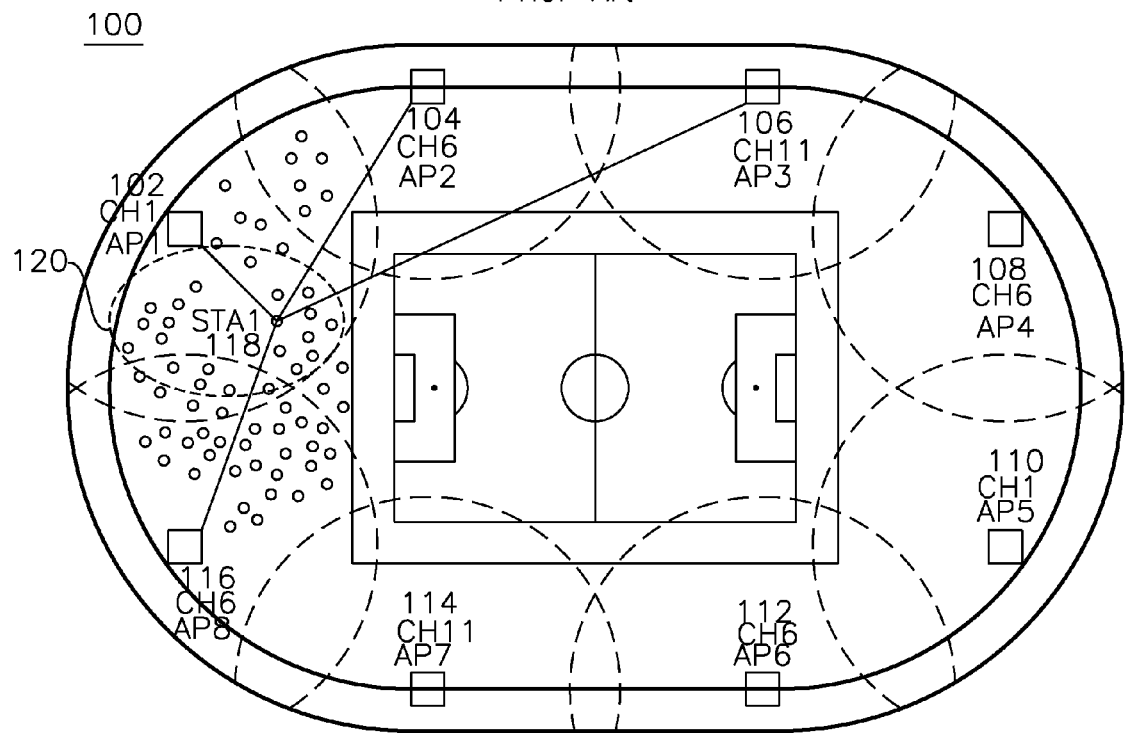
FIG. 1 shows a diagram of a sports stadium with a plurality of access points and a distribution of wireless stations.
Figure 2:
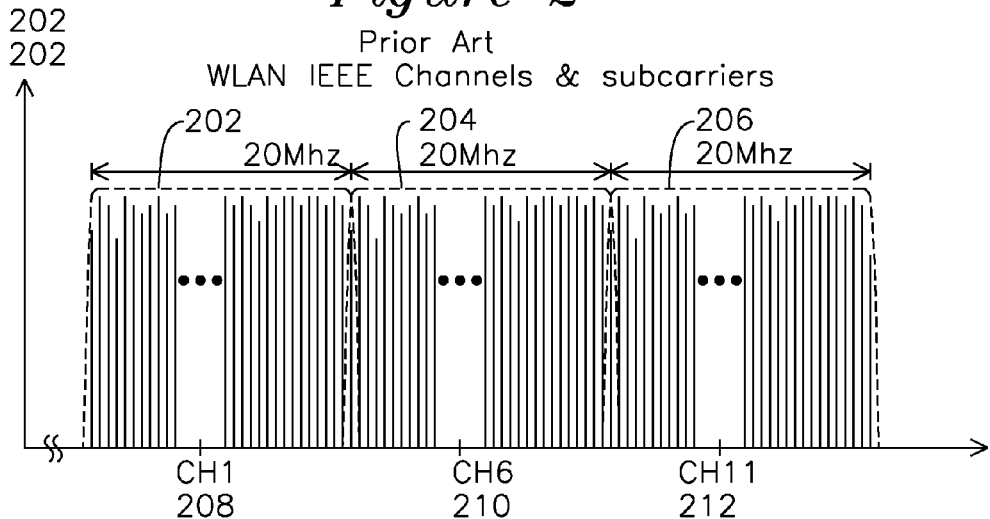
FIG. 2 shows a plot of WLAN OFDM subcarriers grouped to form separate communication channels.

FIG. 4 shows a dense access point distribution with dynamic sub-channel assignment. In the prior art, a single access point 102 of FIG. 1 would be operative on a single channel, and the different channels would be used by the access point to avoid superposition of subcarriers. For example, as shown in FIG. 2, one access point would use channel 1 with subcarriers 202 with non-interfering subcarriers 204, or it could use channel 11 with non-interfering subcarriers 206. In FIG. 4, each access point is operative on a "master channel", which consists of a plurality of non-interfering "sub-channels" which are distinct from any sub-channel of an adjacent master channel, thereby allowing the simultaneous use of these sub-channels within the master channel of the associated master channel. The access points thereby have all of the wireless sub-channels available at each access point, and the wireless sub-channels are managed by each access point to maximize the sub-channel access within each master channel, which channel access is statically or dynamically managed dynamically depending on traffic requirements.

FIG. 5 shows the WLAN channels used by each access point AP1 402, AP2 404, AP3 406, AP4 408, AP5 410, AP6 412, AP7 414, AP8 416. The division of particular frequencies into wireless master channels and thereafter into sub-channels for each master channel may be done in any manner, but is partitioned using IEEE channel numbers as recognized by standards-based WLAN equipment used worldwide. The number of channels required for non-adjacency is typically three or four for a planar station configuration, and may alternatively be selected using the well-known "map coloring algorithm" of graph theory.

FIGS. 6A, 6B, and 6C shows dynamic table entries maintained by each access point (AP) to indicate the subset of available sub-channels from among all of the possible sub-channels that could be assigned to a particular master channel. In the present description of the invention "sub-channel n" is taken to mean a set of subcarriers sufficient for shared media access, such as by 802.11b, 802.11g, or 802.11n, and "channel number" is merely a descriptor in the present invention to distinguish one shared media sub-channel from another, and has no correspondence to the channel numberings used in the IEEE 802.11 family of standards. For example, "IEEE 802.11g channel 6" is defined in the IEEE standard as the 5 Mhz bandwidth which surrounds 2437 Ghz, however in the present invention, channel 0 is the first possible channel, and channel 6 the seventh possible channel.

The channel allocations may be done in any manner by each access point to minimize interference from adjacent access points, but in one embodiment of the invention where each access point is adjacent to another access point on each side, the number of possible frequencies is divided by the number of adjacencies to be shared, with a typical maximum of four (and more typically three). For example, in the case of FIG. 4, AP1 402 is adjacent to AP2 404 and AP8 416, which creates 3 shared adjacencies, and the number of possible channels is 15, so each access point uses a master channel consisting of 5 sub-channels, as shown in FIG. 6A. Channels 0-4 form a first master channel which is available for use by AP1, and channels 5-9 are indicated as in use by adjacent AP2 on one side, and channels 10-14 are reserved for use by AP8, so the first master channel consists of sub-channels 0-4 in use by AP1. Similarly, for AP2 shows in FIG. 6B, channels 0-4 are indicated as non-available because of adjacency to AP1, and channels 10-14 are indicated as non-available because of adjacency to AP3, so the second master channel of AP2 consists of sub-channels 5-9 only. FIG. 6C shows the AP8 channel availability table, with channel 0-4 not available (because of adjacency to AP1), channel 5-9 not available (because of adjacency to AP7), and channels 10-14 in use by AP8, resulting in AP8 using a third master channel comprising sub-channels 10-14. In a similar manner, each access point develops a table of channel availability from the possible channels and interfering adjacencies to avoid.

FIG. 7 shows AP1 712 such as AP1 402 of FIG. 4, and FIG. 8A shows a second table which is the channel assignment to each station, where the channel assignment is taken from the available channels of FIG. 6A. In one embodiment of the invention, a particular number of stations are allowed on a particular channel, so table 8A shows STA0-STA-49 being assigned channel 0, and the 51st station to join STA50 is assigned the next available channel 1. This assignment of channel 1 to new stations associating with AP1 continues until 50 stations on channel 1 are reached, after which channel 2 is advertised by SSID to STA100-149. One mechanism for providing an assignment of stations to channels is by the broadcast of SSID according to availability. For example, AP1 could advertise AP1_SSID_0 initially until 50 associations were completed, and thereafter advertise AP1_SSID_1 until the next 50 stations were associated, continuing in this manner until full utilization were achieved.

In another embodiment of the invention, the allocation of available channels to form master channels having sub-channels for use by the access points is achieved by dynamically allocating more sub-channels to an access point with a larger number of stations or a greater amount of traffic, so as to achieve greater uniformity of loading on each sub-channel, and to provide increased overall bandwidth to the access point which requires it.

In another embodiment of the invention, the association of stations to a particular channel may be revised through an association termination. For example, if there are 50 stations allocated to each of channel 0, channel 1, and channel 2, and four of those stations on channel 0 begin to consume a disproportionate amount of channel bandwidth, those four stations can be moved to other channels through termination of association for those four stations, followed by broadcast by AP1 of AP1_SSID_3 and AP1_SSID_4 for channels 3 and 4, respectively, thereby moving the high demand users to other channels.

Figure 9:
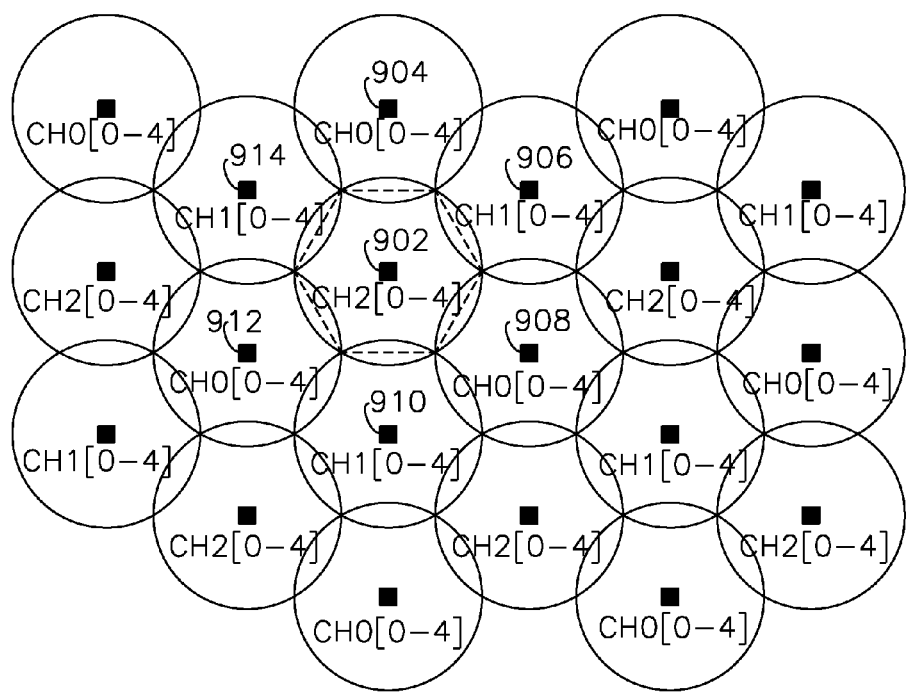
FIG. 9 shows a diagram for a 2 dimensional array of access points with a plurality of channels assigned to each access point.

FIG. 9 shows another embodiment of the invention where the access points are arranged in a hexagonal two dimensional array, with the access point located at the center of each circle indicating range or desired radial extent for stations serviced by the access point. In one example of the invention, there are 15 possible channels available for use, which are allocated to 3 master channels of 5 sub=channels each, with each sub-channel capable of supporting the stations of a particular WLAN without interference or interaction with any of the other 14 sub-channels. This example is shown in the planar configuration of FIG. 9 with a cell 902 (having a dashed line shared boundary) operative on a master channel 2 having 5 sub-channels indicated as [0-4]. Adjacent access points 904, 906, 908, 910, 912, and 914 each operate using a different master channel than access point 902, and each of these access points may assign the sub-channels according to number of stations per sub-channel, or according to the traffic bandwidth requirements of each.

I claim:

1. An access point (AP) for a wireless local area network, the AP assigned to operate on a master channel formed from a plurality of sub-channels, each sub-channel formed from a subset of orthogonal frequency division multiplexed (OFDM) subcarriers within a frequency range, each said OFDM subcarrier occupying a particular single frequency, subcarriers of each said sub-channel having a frequency range which is distinct from any other sub-channel frequency range, each said sub-channel using a unique set of said OFDM subcarriers which are distinct from other sub-channels, each said sub-channel thereby formed from a unique set of said OFDM subcarriers;

said access point assigning one of said sub-channels to a requesting station during an association event when at least one of:
  a number of other stations assigned to said particular sub-channel is below a limit threshold, or
  a bandwidth utilization of other stations assigned to said sub-channel is below a limit threshold;

said access point operative for simultaneous OFDM communications with stations associated with a particular one of said sub-channels, each said sub-channel transmitting or receiving at intervals which are independent of a transmission or reception intervals of said other sub-channels.

2. The access point of claim 1 where each said sub-channel is an IEEE 802.11g channel.

3. The access point of claim 1 where at least one of said sub-channels is in a frequency range of 2.412-2.484 GHz and at least one of said sub-channels is in a frequency range of 5.180-5400 Ghz.

4. The access point of claim 1 where, from a possible plurality of sub-channels, said access point assigns itself a subset of said possible plurality of sub-channels for use as said plurality of sub-channels.

5. The access point of claim 4 where said access point associates a status or activity for each sub-channel in said plurality of sub-channels.

6. The access point of claim 5 where said access point association is periodically updated to remove sub-channel assignments.

7. An access point (AP) for a wireless local area network, said AP operative on a master channel formed from a plurality of sub-channels, said plurality of sub-channels formed as a subset of possible sub-channels;
   each said possible sub-channel operative within a frequency band unique from other said possible sub-channels;
   each said sub-channel using orthogonal frequency division multiplexing (OFDM) formed from subcarriers within said sub-channel;
   said sub-channels determined by said access point to be either available or unavailable;
   said access point advertising a wireless Service Set IDentifier (SSID) for a particular available sub-channel and accepting association requests in response to said advertised SSID until a threshold is reached;
   said threshold based on either a threshold number of station connections or a threshold bandwidth utilization of stations currently associated with said access point;
   said access point thereafter indicating said particular sub-channel is unavailable and thereafter advertising the SSID of a different available sub-channel.

8. The access point of claim 7 where said advertised available sub-channel of said master channel is a sub-channel of said master channel with fewer station connections than any other sub-channel of said master channel.

9. The access point of claim 7 where said available sub-channels of said master channel are sub-channels below a threshold level of traffic.

10. The access point of claim 7 where said master channel is formed from an available subset of sub-channels which are not used in a master channel of an adjacent access point.

11. The access point of claim 7 where said sub-channels of a master channel are allocated according to a number of adjacent access points.

12. The access point of claim 7 where the access point determines the number of said sub-channels in said master channel by dividing a number of possible sub-channels by a number of access point adjacencies.

13. An access point having adjacencies with other access points, the access point operative in an orthogonal frequency division multiplexing (OFDM) communications system using a plurality of possible sub-channels formed from available sub-channels formed from available subcarriers which can be used by said access point, each said available subcarrier operative on a unique frequency, the access point having:
   a master channel formed by a subset of said possible sub-channels, said master channel using a unique set of said sub-channels which are distinct from sub-channels of a master channel in use by an adjacent access point;
   said sub-carriers of said master channel being within a unique frequency range from the sub-carriers of other sub-channels of said master channel;
   each sub-channel indicated by said access point as available or unavailable;
   said access point advertising a particular said available sub-channel for connection requests based on a threshold until a number of connection is reached for that particular sub-channel.

14. The access point of claim 13 where said access point maintains an association of said sub-channels to said master channel, each said sub-channel having an associated metric compared to said threshold which determines whether said sub-channel is available or unavailable.

15. The access point of claim 14 where said metric is a number of station connections present on said sub-channel.

16. The access point of claim 14 where said metric is a data throughput of said sub-channel.

* * * * *